Aug. 4, 1959  D. W. STROM  2,897,578
COMPOUND SLIDE REST
Filed July 30, 1957  4 Sheets-Sheet 1
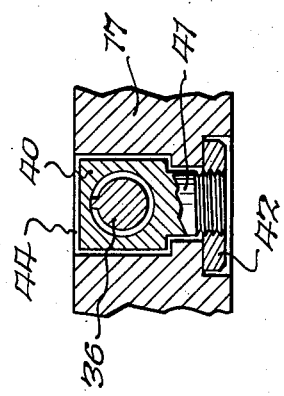
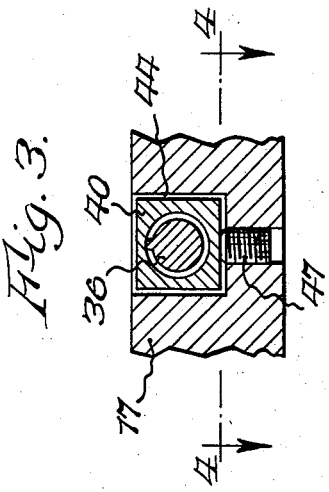
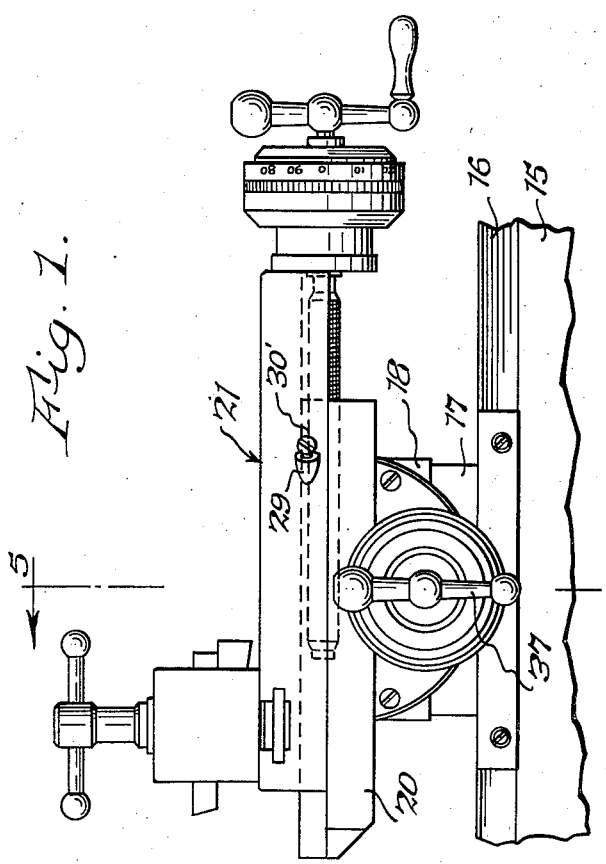
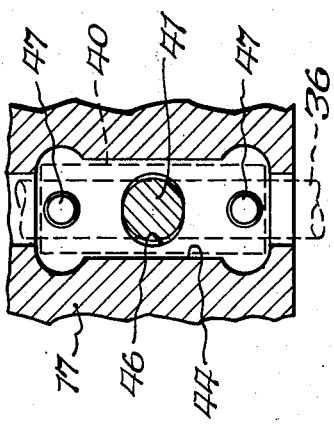
INVENTOR.
David W. Strom,
BY
Parker & Brockman,
Attorneys.

Aug. 4, 1959
D. W. STROM
2,897,578
COMPOUND SLIDE REST
Filed July 30, 1957
4 Sheets-Sheet 2
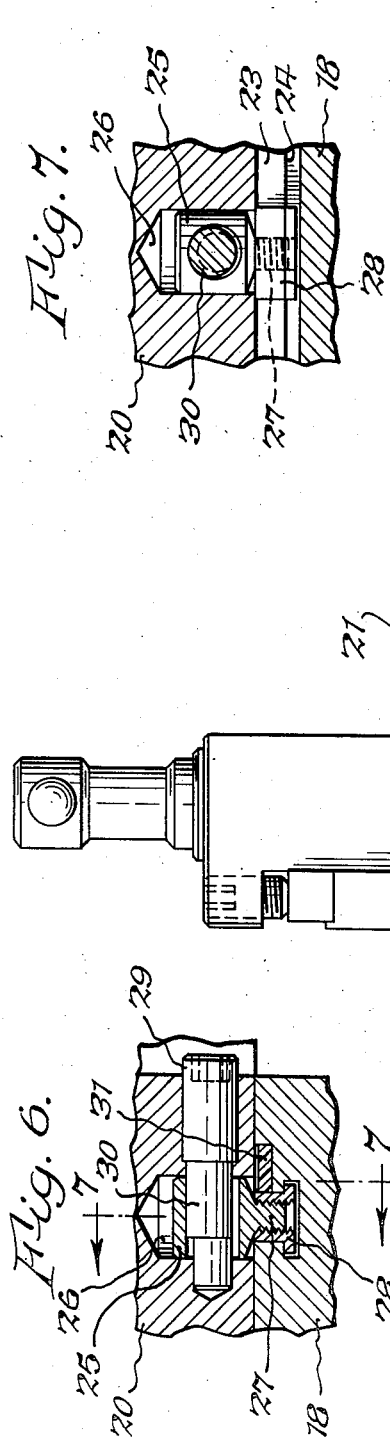
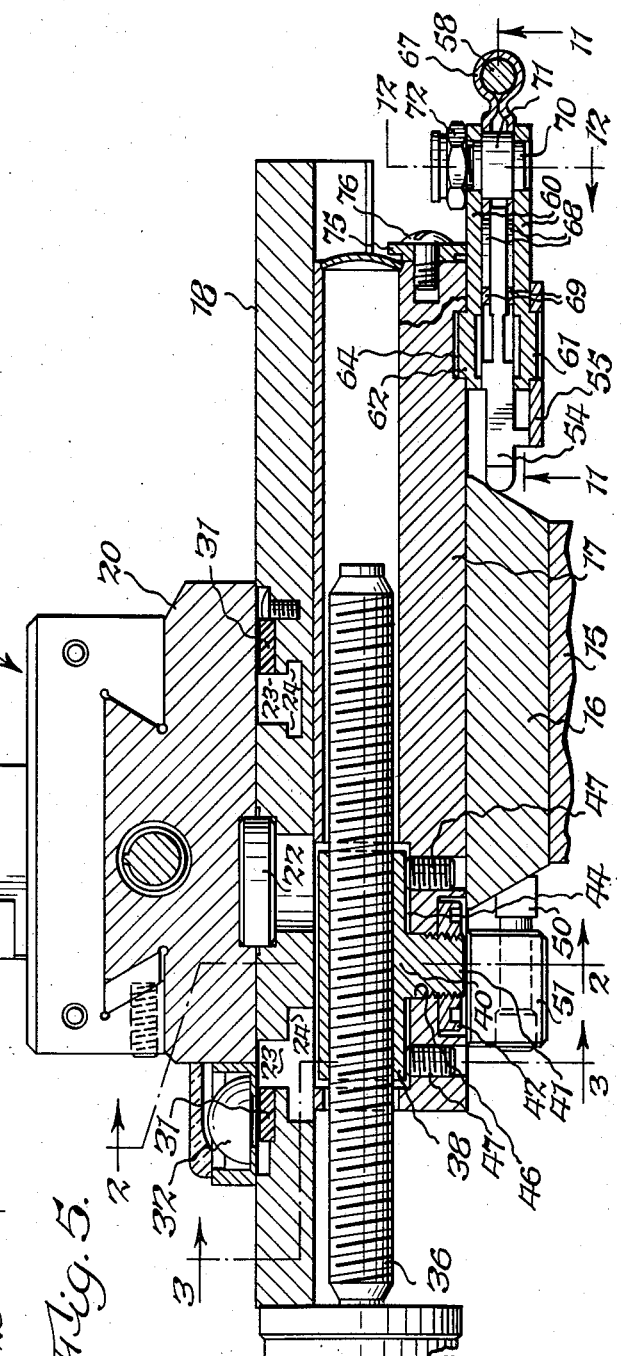
INVENTOR.
David W. Strom
BY
Parker & Rischman,
Attorneys.

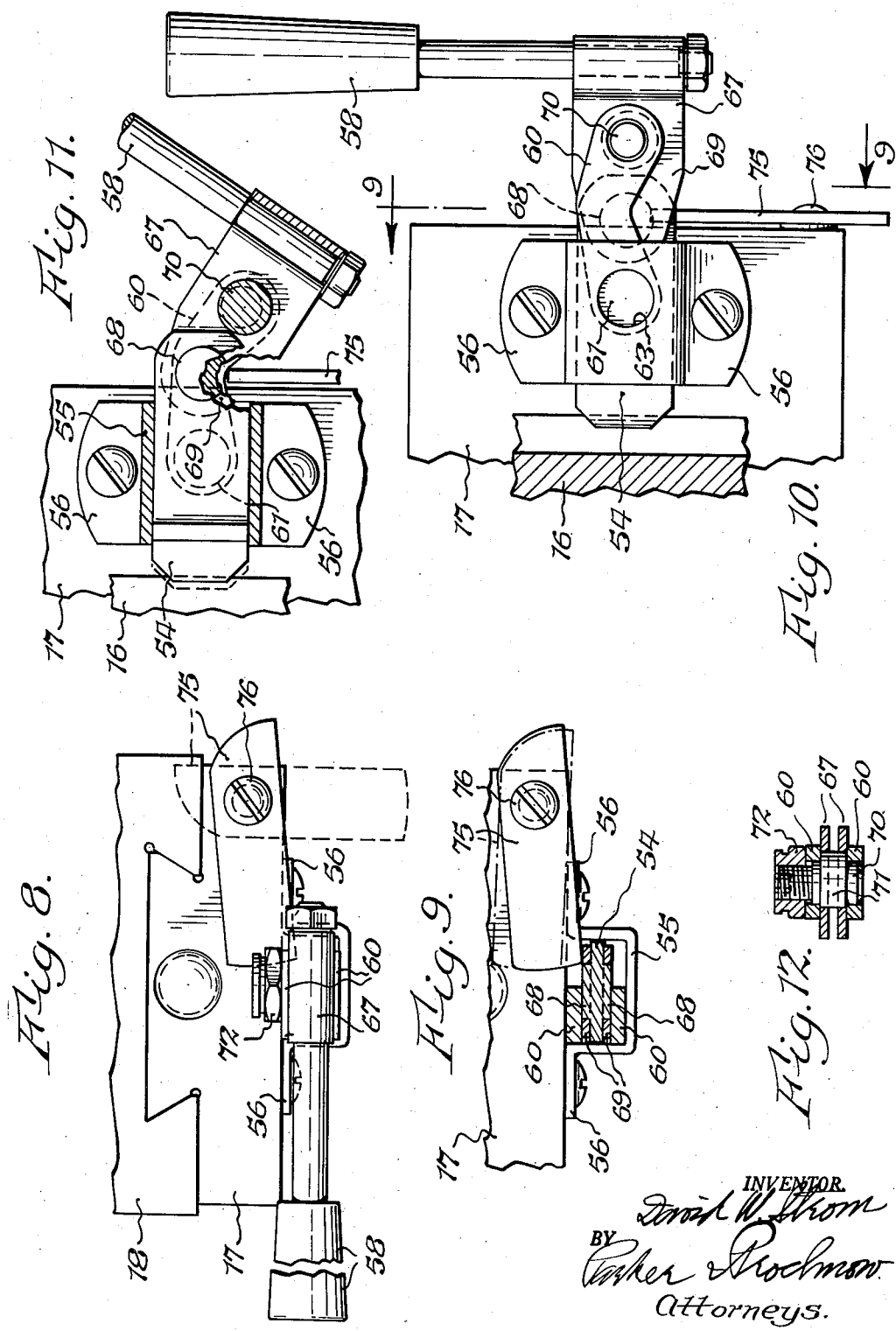

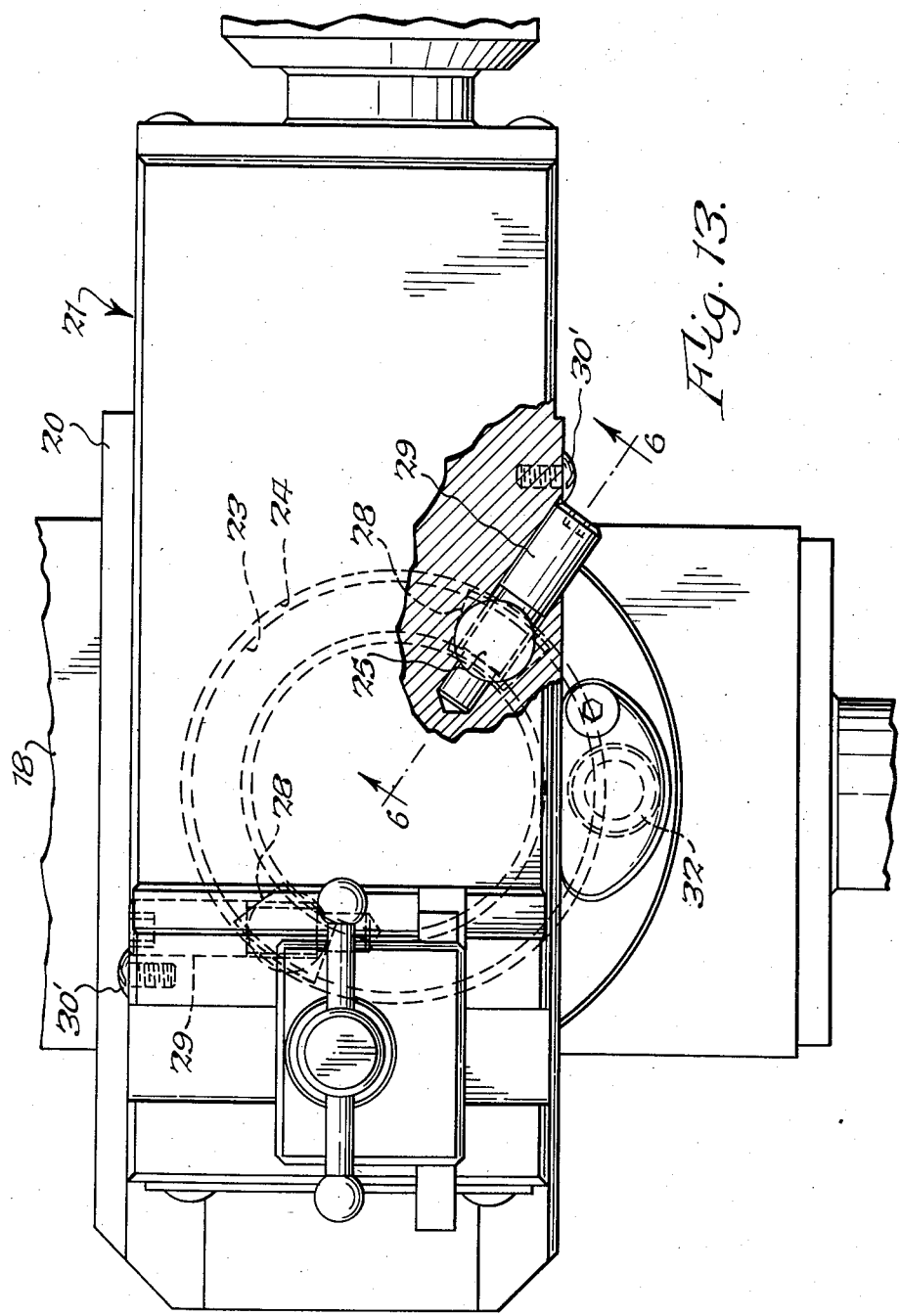

United States Patent Office 2,897,578
Patented Aug. 4, 1959

2,897,578

COMPOUND SLIDE REST

David W. Strom, Elmira, N.Y., assignor to Hardinge Brothers, Inc., Elmira, N.Y.

Application July 30, 1957, Serial No. 675,119

3 Claims. (Cl. 29—1)

This invention relates to improvements in compound slide rests such as are commonly used on metal working lathes and other machines.

In slide rests of this type, in which a high degree of accuracy is required to enable the machine to work within very small tolerances, the adjusting screw for moving the bottom slide of the slide rest and the nut with which it cooperates must be machined with a very high degree of accuracy. Heretofore, in order to provide the necessary degree of accuracy, the nut had to be specially machined to fit the adjusting screw while the nut was rigidly mounted on a part of the slide rest. Consequently it was necessary when the nut became worn, to send the entire slide rest back to the manufacturer so that a new nut could be rigidly secured on the base for the bottom slide and then accurately threaded while in place thereon, or the user of the machine had to acquire the necessary equipment for performing this operation. This always required the user of the machine either to have an additional compound slide rest on hand to replace the one sent back to the factory or to provide himself with the rather expensive equipment for cutting a thread in a new nut while the same was in the slide rest, or the machine would have to be kept idle until the slide rest was returned by the manufacturer.

An object of this invention is to provide a compound slide rest with means of improved construction for releasably locking the same on the bed of the lathe, and particularly to provide a locking device which would only partly release the compound slide rest from the lathe bed to permit it to be shifted lengthwise of the bed but holding the slide rest against falling off of the lathe bed in a forward direction.

A further object is to provide a lock of this type with means shiftable into positions to permit the slide rest to be either partly unlocked from the lathe bed to permit adjustment of the slide relatively to the lathe bed, or to be entirely unlocked from the lathe bed so that it can be removed therefrom.

Other objects and advantages will be apparent from the following description of some embodiments of the invention, and the novel features will be particularly pointed out hereinafter in connection with the appended claims.

In the accompanying drawings:

Fig. 1 is a front elevation of a compound slide rest showing the same mounted on a portion of a lathe bed.

Figs. 2 and 3 are fragmentary, transverse, sectional elevations thereof on lines 2—2 and 3—3 respectively of Fig. 5.

Fig. 4 is a fragmentary, sectional plan view thereof on line 4—4, Fig. 3.

Fig. 5 is a transverse, sectional elevation of the slide rest, the section being taken on line 5—5, Fig. 1.

Fig. 6 is a fragmentary, sectional elevation thereof on line 6—6, Fig. 13.

Fig. 7 is a fragmentary sectional view thereof on line 7—7, Fig. 6.

Fig. 8 is a fragmentary, end elevation of the base of the bottom slide showing the means for clamping the same on the lathe bed.

Fig. 9 is a fragmentary, rear elevation thereof, partly in section, to show cooperation of the safety latch with the locking mechanism, the section being on line 9—9, Fig. 10.

Fig. 10 is a fragmentary, bottom plan view thereof showing the mechanism for locking the slide rest on the lathe bed.

Fig. 11 is a fragmentary, sectional plan view thereof on line 11—11, Fig. 5.

Fig. 12 is a sectional elevation thereof on line 12—12, Fig. 5.

Fig. 13 is a top, plan view thereof, partly in section.

My improved slide rest is shown in the drawings as applied to a lathe having a bed 15 provided on the upper portion thereof with a bed plate 16 of hardened material and having a flat top and downwardly and inwardly converging, longitudinal edge portions. 17 represents a base for the bottom slide 18 of the slide rest, the base being adjustable lengthwise of the lathe bed plate 16 and releasably secured thereto, as will be hereinafter described.

20 represents a turntable on which the upper slide 21 of the lathe is mounted. This turntable may be guided by any usual or suitable means for rotation about its axis, for example, by means of a center rod disk 22 bearing in registering circular recesses formed on the under surface of the turntable 20 and on the upper face of the bottom slide 18 of the lathe.

In order to secure the turntable 20 in its angularly adjusted position, I have provided in the bottom slide 18 an annular, undercut groove 23 which is concentric with the central disk 22 and which forms shoulders 24. The turntable 20 is provided with a pair of draw bolts, Figs. 6, 7 and 13, preferably arranged at diametrically opposite portions of the turntable 20 and having shoulder parts which engage with the shoulders 24 of the groove 23. Each of these draw bolts is provided with a head 25 slidably arranged in a recess 26 in the turntable and having a screwthreaded shank 27. This shank has a threaded engagement with a sleeve 28 provided at its lower end with an outwardly extending flange formed to engage the shoulders 24 of the channel 23.

These sleeves, together with the heads 25, may be drawn upwardly into locking position by any suitable means and in the construction shown I have provided eccentric bolts 29 which extend through suitable apertures in the turntable and intersecting the apertures 26 in which the heads of the clamping devices are arranged. These bolts are provided with eccentric portions 30 arranged within transverse holes of the heads 25 so that by turning the eccentric bolts 29, the sleeves 28 may be moved up or down into clamping or releasing positions.

Suitable means may also be provided for holding the clamping bolts 29 in any adjusted positions, and for this purpose I have provided clamping screws 30' arranged in threaded holes in the turntable and having heads which extend into position to frictionally engage the outer ends of the clamping bolts. Clamping bolts of any other suitable construction may be provided if desired.

The turntable is also preferably provided with a ring 31 suitably secured thereto and extending into a groove in the bottom slide 18 and having the usual graduations on the upper face thereof. As the turntable is rotated, graduations on the upper face of this ring 31 may be seen through a magnifying glass 32, as shown in Fig. 5 to enable the operator to accurately position the upper slide in the desired angular relation to the lower slide.

The movement of the lower slide crosswise of the bed of the lathe is effected by means of the usual adjusting screw 36, which may be rotated by means of the usual handle 37, Fig. 1. This screw extends through and cooperates with a nut mounted in a base for the bottom slide, the end of the screw which is actuated by the handle 37 being suitably connected with the bottom slide 18, for example, by means of a part 38, Fig. 5 for movement of the same transversely of the lathe bed. This nut heretofore had been rigidly and fixedly secured to the base 17 for the bottom slide, and since the nut and screw are required to operate with a high degree of accuracy in precision lathes, any wear on the screw or nut which provided for play or lost motion between the screw and the nut made it necessary to return the slide rest to the factory where facilities were available for producing a screw and nut operating with the desired degree of accuracy, or it was necessary for the user of the lathe to provide himself with special mechanism whereby this highly accurate machining of the nut could be effected.

In order to overcome the necessity for threading a nut while it is mounted in the base for the bottom slide, I have now provided a nut 40 which is readily removable from and mountable on the base of the bottom slide and which is provided with means for accurately positioning the same therein. This nut is elongated in the direction of the length of the screw and is provided intermediate of the ends thereof with a downwardly extending stud or boss 41, the lower end of which is threaded to cooperate with a clamping nut 42. The nut 40 is arranged loosely in a recess 44 formed in the upper face of the base for the bottom slide and means are provided for positioning the nut in the recess 44 so that the threaded hole in the nut will be in correct engagement with the feed screw 36.

In order to provide for the correct adjustment of the nut 40 to aline the same with the screw 36, I provide a hole 46 for the stud 41 which is elongated in a direction transversely of the screw 36. This hole 46 is of such width that the stud 41 has a close sliding fit therewith, but the hole is elongated crosswise of the screw 36 so that the stud 41 of the nut may be moved in either direction transversely of the screw 36 to correctly position the nut 40. The base for the bottom slide is also provided with upwardly extending threaded holes terminating in the recess 44 and set screws 47 are provided in these holes, the upper ends of the set screws engaging the lower face of the nut 40 for adjusting and supporting the nut vertically for correct cooperation with the adjusting or cross slide feed screw 36. Consequently the nut 40 may be shifted sidewise in its recess 44 and may be raised to the desired elevation and also tilted to a limited extent by means of the set screws 47 and finally the nut 42 which cooperates with the threaded lower end of the stud 41 is tightened for securely holding the nut in the adjusted position in which the thread of the nut cooperates accurately with the thread of the screw 37.

By means of this construction the nut for the cross slide feed screw can be threaded before being mounted on the slide rest and positioned with a high degree of accuracy with relation to the feed screw, both laterally with reference to the feed screw as well as vertically and at a slight angle. This may be done by first positioning the nut loosely in the recess 44 and supporting the same by means of the screw 36. This will locate the nut so that the stud 41 will be in the correct position transversely of the laterally elongated hole 46. The set screws 47, which are positioned to engage the nut 40 near the opposite ends thereof, are then moved to support the nut in the position in which it is held by the screw 36. By then tightening the stud nut 42, the nut 40 will be securely locked in its operative position.

While I have shown this nut mounting applied to the nut which cooperates with the cross slide screw, it will be understood that this mounting may also be used in connection with any other slide adjusting screw.

The means for locking the base for the bottom slide on the bed plate 16 of the lathe includes any usual or suitable adjustable bolt 50 arranged in a support 51 extending downwardly from the base 17 for the bottom slide and engaging the back face or bevelled edge of the bed plate. This bolt 50 may be adjusted to set the compound slide rest in desired relation to the lathe bed and may be of any usual construction.

The rear bevelled edge of the bed plate 16 is engaged by means of a bolt or plunger 54 slidable in a guide member 55 suitably mounted on the base 17 for the bottom slide, the guide member having ears or lugs 56 which are fastened to the undersurface of the base 17 for the bottom slide and has a substantially U-shaped portion in which the plunger 54 is guided toward and from the lathe bed. As shown in Fig. 9, the side edges of the plunger 54 bear against the inner faces of the sides of the U-shaped part 55 of the guide member. The plunger may be moved back and forth by means of a pivoted handle 58 operating through a pair of links 60.

In the particular construction illustrated, the upper and lower links 60 each have one of their ends pivoted to swing on an axis which is fixed in relation to the base 17. In the construction shown for this purpose the links are provided with outwardly extending bosses 61 and 62. The boss 61 of the lower link extends into a hole 63 formed in the lower part of the U-shaped portion of the guide member 55 and the boss 62 of the other link extends into a similar hole or recess 64 formed in the under face of the slide rest base 17, as clearly shown in Fig. 5. The opposite ends of the links are pivotally connected with the handle 58, and for this purpose the handle is provided at one end thereof with an arm or extension 67 which extends outwardly from one side of the handle and which is pivotally mounted on the bolt or plunger 54.

In the construction shown for this purpose, the arm 67 is in the form of a strip of metal bent or looped around a part of the handle 58 and secured thereto and having the two ends 69 provided with bearing holes extending about lugs or bosses 68 formed on the opposite faces of the plunger 54.

The pivotal connection between the links 60 and the arm 67 of the handle may be of any suitable or desired type but preferably this pivot is adjustable in such a manner that when the handle is swung into the position shown in Figs. 5 and 10, the bolt or plunger 54 will be tightly locked against the bed plate 16. For this purpose a bolt 70 is employed, Figs. 5 and 12, which has portions of reduced diameter rotatable in holes formed in the outer ends of the links 60 and an intermediate cam or eccentric portion 71 which engages in bearing apertures formed in the two parts of the arm 67 of the handle. One end of the bolt 70 is threaded to cooperate with a nut 72. When this nut is tightened, it will be obvious that the shoulder on the bolt formed by the cam or eccentric portion 71, which is of larger diameter than the other parts of the bolt, will be pressed against the upper link 60 for locking this bolt in adjusted position. Consequently, when the locking handle 58 is swung into the position shown in Figs. 5 and 10, it will be noted that it is in dead center position so as to hold the bolt or plunger 54 securely in engagement with the bed plate 16. The bolt 70 is adjusted so that when the handle 58 is in the position shown in Figs. 5 and 10, the plunger will be securely pressed into its locking position. It will be readily noted, particularly in Fig. 5, that if the bolt or plunger 54 becomes entirely disengaged from the bed plate 16, it is possible for the compound slide rest to pivot on the front edge of the bed plate 16 and thus swing forwardly due to the fact that the center of gravity of the slide rest is forwardly of or adjacent to this edge of the bed plate. When it is desired to remove the slide rest from the bed plate, the handle 58 must of course be swung farther away so as to clear the bolt or plunger 54 from the rear edge of the bed plate. However, the slide rest is frequently unlocked from the bed plate for the purpose of shifting the same lengthwise of the lathe bed and consequently, in order to prevent accidental falling of the slide rest from the lathe bed, I have provided means for normally holding the bolt or plunger 54 in partly withdrawn position in which it is prevented from swinging beyond the rear edge of the bed plate.

In the construction shown for this purpose I have provided a safety latch 75 which is pivoted by means of a screw or pivot pin 76 on the base 17 for the bottom slide. This safety latch is free to swing about its supporting pin 76 and the safety latch is unbalanced by arranging the pivot screw 76 near one end of the safety latch. This latch, when swung into the position shown in full lines in Figs. 8 to 11 rests on an end 69 of the arm 67 and extends into the path of movement of the upper of the two links 60 so that, as shown in Fig. 11, these links cannot be swung beyond the position shown in that figure. This limits the swing of the bolt or plunger 54 by means of the handle 58 into a position shown in full lines in Fig. 11, in which the bolt or plunger 54 would engage the rear edge of the bed plate if the slide rest should swing forwardly. The bolt or plunger would consequently prevent the slide rest from falling off of the bed of the lathe. However, if it is desired to remove the slide rest from the lathe, the safety latch may be swung into the position shown in broken lines in Fig. 9, in which case the handle 58 could be swung farther than shown in Fig. 11 so as to move the bolt or plunger 54 into a completely withdrawn position in which the slide rest can be removed from the lathe bed.

The latch, when not to be used, can be swung into a substantially vertical position, as shown in broken lines in Fig. 8, and from this position it can be readily swung back into the full line positions shown in Figs. 8 to 11, in which it automatically prevents movement of the plunger 54 into a position in which its slide rest could topple off the lathe bed. However, when the plunger is in its operative position, shown in full lines, it does not interfere with turning the handle 58 sufficiently to permit the slide rest to be moved along the lathe bed.

It will be understood that various changes in the details, materials and arrangements of parts which have been herein described and illustrated in order to explain the nature of the invention, may be made by those skilled in the art within the principle and scope of the invention as expressed in the appended claims.

I claim:

1. A slide rest adjustably mounted on a machine bed having downwardly converging side edges, said slide rest having a base provided with a part engageable with one of said side edges, a plunger movable into and out of locking engagement with the other side edge, means actuating said plunger for moving the same into and out of engagement with said other edge, and stop means movable at will into a position for limiting the movement of said plunger away from said other side edge, to prevent said slide rest from being removable from said bed, said stop means being movable into another position in which said plunger may be withdrawn to a greater extent from said other side edge to permit removal of said slide rest from said bed.

2. A slide rest adjustably mountable on a machine bed having downwardly converging side edges, said slide rest having a base provided with a part engageable with one of said side edges, a plunger movable into and out of locking engagement with the other side edge, a lever swingable to move said plunger into and out of engagement with said other side edge, a latch movable into a position to limit the movement of said lever in a direction to withdraw said plunger from engagement with said other side edge to an extent sufficient to permit adjustment of said slide rest on said bed, but insufficient to permit removal of said slide rest from said bed, said latch being movable into a releasing position to permit said lever to withdraw said bolt further from said bed to permit removal of said slide rest from the lathe bed.

3. A slide rest adjustably mounted on a machine bed having downwardly converging side edges, said slide rest having a base provided with a part engageable with one of said side edges, a plunger movable into and out of locking engagement with the other side edge, a lever pivotally connected with said plunger, a link pivoted at one end on said slide rest and at its other end on said lever and movable relatively to said lever and said slide rest when said lever moves said plunger into and out of position to lock said slide rest on said bed, and a latch movable into a position to engage said link after limited movement thereof to hold said plunger in a position to permit movement of said slide rest lengthwise of said bed, but preventing removal of said slide rest from said bed, said latch being movable into another position out of the path of movement of said link to permit said plunger to be withdrawn to a greater distance from said other side edge to permit said slide rest to be removed from said bed.

References Cited in the file of this patent

UNITED STATES PATENTS

| | | |
|---|---|---|
| 300,041 | Card | June 10, 1884 |
| 434,930 | Houghtaling | Aug. 26, 1890 |
| 454,959 | Walker | June 30, 1891 |
| 892,457 | Smith | July 7, 1908 |
| 1,409,243 | Schmidt et al. | Mar. 14, 1922 |
| 2,438,235 | Strom | Mar. 23, 1948 |
| 2,703,498 | Tree | Mar. 8, 1955 |

FOREIGN PATENTS

| | | |
|---|---|---|
| 89,257 | Germany | Nov. 2, 1896 |
| 497,976 | Canada | Nov. 24, 1953 |